(12) United States Patent
Oura

(10) Patent No.: US 6,392,658 B1
(45) Date of Patent: May 21, 2002

(54) PANORAMA PICTURE SYNTHESIS APPARATUS AND METHOD, RECORDING MEDIUM STORING PANORAMA SYNTHESIS PROGRAM 9

(75) Inventor: Koutatsu Oura, Chofu (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/391,945

(22) Filed: Sep. 8, 1999

(30) Foreign Application Priority Data

Sep. 8, 1998 (JP) .......................... 10-254031

(51) Int. Cl.[7] ................... H04N 5/222; H04N 5/225; H04N 5/265; G06T 1/00
(52) U.S. Cl. ................... 345/629; 345/630; 345/473; 345/474; 345/619; 348/36; 382/282; 382/284
(58) Field of Search ................... 345/473, 474, 345/418–419, 421, 619–621, 624–625, 629–630, 638; 348/121, 96, 38–39, 47–48, 36; 382/282–284; 358/87; 396/20, 326, 322

(56) References Cited

U.S. PATENT DOCUMENTS

| 4,772,942 | A | * | 9/1988 | Tuck | 358/87 |
|---|---|---|---|---|---|
| 5,130,794 | A | * | 7/1992 | Ritchey | 358/87 |
| 5,742,334 | A | * | 4/1998 | Yagura | 348/96 |
| 5,850,253 | A | * | 12/1998 | Inoue | 348/96 |
| 5,850,352 | A | * | 12/1998 | Moezzi | 364/514 |
| 5,920,657 | A | * | 7/1999 | Bender | 382/284 |
| 5,937,212 | A | * | 8/1999 | Kurahashi | 396/20 |
| 5,963,247 | A | * | 10/1999 | Banitt | 348/121 |
| 5,963,664 | A | * | 10/1999 | Kumar | 382/154 |
| 6,081,278 | A | * | 6/2000 | Chen | 345/473 |
| 6,205,259 | B1 | * | 3/2001 | Komyia | 382/284 |
| 6,215,505 | B1 | * | 4/2001 | Minami | 345/473 |

FOREIGN PATENT DOCUMENTS

| JP | 10-108003 | | 4/1998 | |
|---|---|---|---|---|
| JP | 11-289447 | * | 10/1999 | H04N/1/387 |
| JP | 411344966 | * | 12/1999 | G09G/5/00 |
| JP | 2001008192 | * | 1/2001 | H04N/7/18 |

* cited by examiner

Primary Examiner—Matthew Luu
Assistant Examiner—Wesner SaJous
(74) Attorney, Agent, or Firm—Frishauf, Holtz, Goodman, Langer & Chick, P.C.

(57) ABSTRACT

A panorama picture synthesis apparatus synthesizes a panorama picture from a plurality of picture data obtained by capturing a plurality of parts of an object such that they overlap one another. The panorama picture synthesis apparatus comprises a whole picture display section for displaying a whole picture including all pictures constituting the panorama picture, a partial picture designating section for designating a plurality of partial pictures within a predetermined range of the whole picture, an automatic synthesizing section for synthesizing the partial pictures designated by the partial picture designating section by automatically joining them to construct an automatically synthesized picture, a manual synthesizing section for dividing the automatically synthesized picture into divided pictures in accordance with a predetermined operation, and for synthesizing the divided pictures by manually joining them to construct a manually synthesized picture, and a partial picture display section for displaying the pictures synthesized by the automatic synthesizing section or the manual synthesizing section in an enlarged size on a screen simultaneously with the whole picture.

27 Claims, 9 Drawing Sheets

PICTURE1

PICTURE2

PICTURE3

PANORAMA PICTURE SYNTHESIS APPARATUS AND METHOD, RECORDING MEDIUM STORING PANORAMA SYNTHESIS PROGRAM 9

BACKGROUND OF THE INVENTION

The present invention relates to a method and apparatus for panorama picture synthesis for synthesizing a panorama picture from a plurality of continuous pictures, and a recording medium storing a panorama synthesis program.

In recent years, a panorama picture synthesis apparatus has been proposed, wherein a plurality of pictures captured by a digital camera (an electronic still camera) are joined to be synthesized to construct a panorama picture. In the apparatus, the digital camera captures a plurality of partial pictures of an object, such that they overlap one another. The captured partial pictures are joined to be synthesized by connecting adjacent partial pictures, to construct a panorama picture.

Pictures may be processed as described above by the digital camera itself. However, it is practical to process pictures in a computer (e.g., a personal computer), in consideration of the cost of the camera, the size of picture data, the processing speed, the size of the processing program, etc. In this case, it is requested to realize a processing apparatus or a processing program for easily performing picture synthesis without requiring complex operations by the user.

However, if the partial pictures constructing the whole picture are all displayed on the personal computer to join and observe adjacent pictures based on the display, the areas of respective partial pictures to be synthesized are reduced as the number of pictures increases. Therefore, the display areas of two pictures to be joined together are so small that it is difficult to accurately join the pictures. In contrast, if partial pictures to be synthesized are enlarged and successively displayed without displaying all the partial pictures, and the partial pictures are joined together with reference to the enlarged pictures, the overall result of synthesis cannot be observed, although the joining process can be confirmed accurately.

Jpn. Pat. Appln. KOKAI Publication No. 10-108003 (disclosed Apr. 24, 1998) describes a picture synthesis method in which partial pictures for synthesis are roughly joined by a manual operation, and thereafter automatically synthesized by pattern matching. This method presupposes that a synthesized picture is obtained by a manual operation. Therefore, picture synthesis requires a troublesome operation and a considerable period of time. In addition, it takes a great deal of time to synthesize many pictures by successively joining adjacent pictures, resulting in an increase in load on the user.

On the other hand, if adjacent partial pictures are automatically joined, the load on the user can be reduced. In this case, however, the degree of freedom of joining pictures is less.

BRIEF SUMMARY OF THE INVENTION

An object of the present invention is to provide a panorama picture synthesis apparatus which can accurately join a number of pictures and image the overall portion of a synthesized result during the synthesis process.

Another object of the present invention is to provide a panorama picture synthesis apparatus which can reduce the load on the user required to join a number of pictures and keep the degree of freedom of joining the pictures.

Still another object of the present invention is to provide a recording medium storing a panorama synthesis program for realizing the aforementioned process on a computer.

According to an aspect of the present invention, there is provided a panorama picture synthesis apparatus for synthesizing a panorama picture from a plurality of picture data obtained by capturing a plurality of parts of an object such that they overlap one another, the panorama picture synthesis apparatus comprising a whole picture display section which displays a whole picture including all pictures constituting the panorama picture, a partial picture designating section which designates a plurality-of partial pictures within a predetermined range of the whole picture, an automatic synthesizing section which synthesizes the partial pictures designated by the partial picture designating section by automatically joining them to construct an automatically synthesized picture, a manual synthesizing section which divides the automatically synthesized picture into divided pictures in accordance with a predetermined operation, and synthesizes the divided pictures by manually joining them to construct a manually synthesized picture, and a partial picture display section which displays the pictures synthesized by the automatic synthesizing section or the manual synthesizing section in an enlarged size on a screen simultaneously with the whole picture.

According to another aspect of the present invention, there is provided a panorama picture synthesis method which comprises the steps of displaying a whole picture including all pictures constituting a panorama picture based on a plurality of picture data obtained by capturing a plurality of parts of an object, such that they overlap one another, designating a plurality of partial pictures within a predetermined range of the whole picture, synthesizing the designated partial pictures by automatically joining them to construct an automatically synthesized picture, dividing the automatically synthesized picture into divided pictures in accordance with a predetermined operation, and synthesizing the divided pictures by joining manually them to construct a manually synthesized picture, and enlarging the partial pictures synthesized by the automatically synthesizing step or the manually synthesizing step and displaying the enlarged partial pictures on a screen simultaneously with the whole picture.

According to still another aspect of the present invention, there is provided a recording medium storing a panorama picture synthesis program, readable by a computer, used for controlling the computer so as to synthesize a panorama picture from a plurality of picture data obtained by capturing a plurality of parts of an object such that they overlap one another, the program comprising instruction means for instructing the computer to display a whole picture including all pictures constituting the panorama picture, instruction means for instructing the computer to designate a plurality of partial pictures within a predetermined range of the whole picture, instruction means for instructing the computer to synthesize the designated partial pictures by automatically joining them to construct an automatically synthesized picture, instruction means for instructing the computer to divide the automatically synthesized picture into divided pictures in accordance with a predetermined operation, and synthesizing the divided pictures by manually joining them to construct a manually synthesized picture, and instruction means for instructing the computer to display the automatically or manually jointed pictures in an enlarged size on a screen simultaneously with the whole picture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described with reference to the accompanying drawings.

Figure 1:
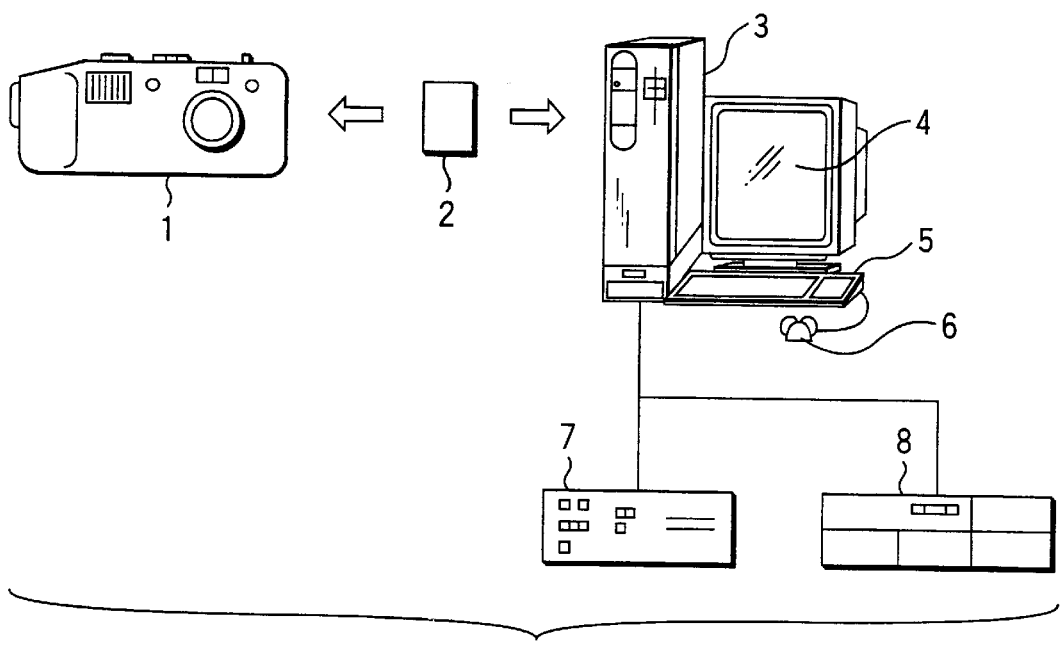
FIG. 1 is a diagram showing a system structure of a panorama picture synthesis apparatus according to a first embodiment of the present invention.

FIG. 1 is a diagram showing a system structure of a panorama picture synthesis apparatus according to a first embodiment of the present invention.

A digital camera 1 incorporates an image sensor, such as a CCD (charge coupling device), for photo-electrically converting the picture to data. The digital camera 1 is constructed to record the photo-electrically converted data in a recording medium 2 comprising, for example, a flash memory, detachably inserted in the camera. The recording medium 2 can be inserted in a reader unit of a personal computer 3, so that the recorded picture data can be read out to the personal computer 3.

The personal computer 3 is connected to a display 4 for displaying pictures and other process information, a keyboard 5 for mainly inputting characters, and a mouse 6 for indicating a position of a screen displayed on the display 4. If necessary, the personal computer 3 may further be connected to a digital recorder 7 for recording a large amount of picture data and a printer 8 for printing a picture.

Figure 2:
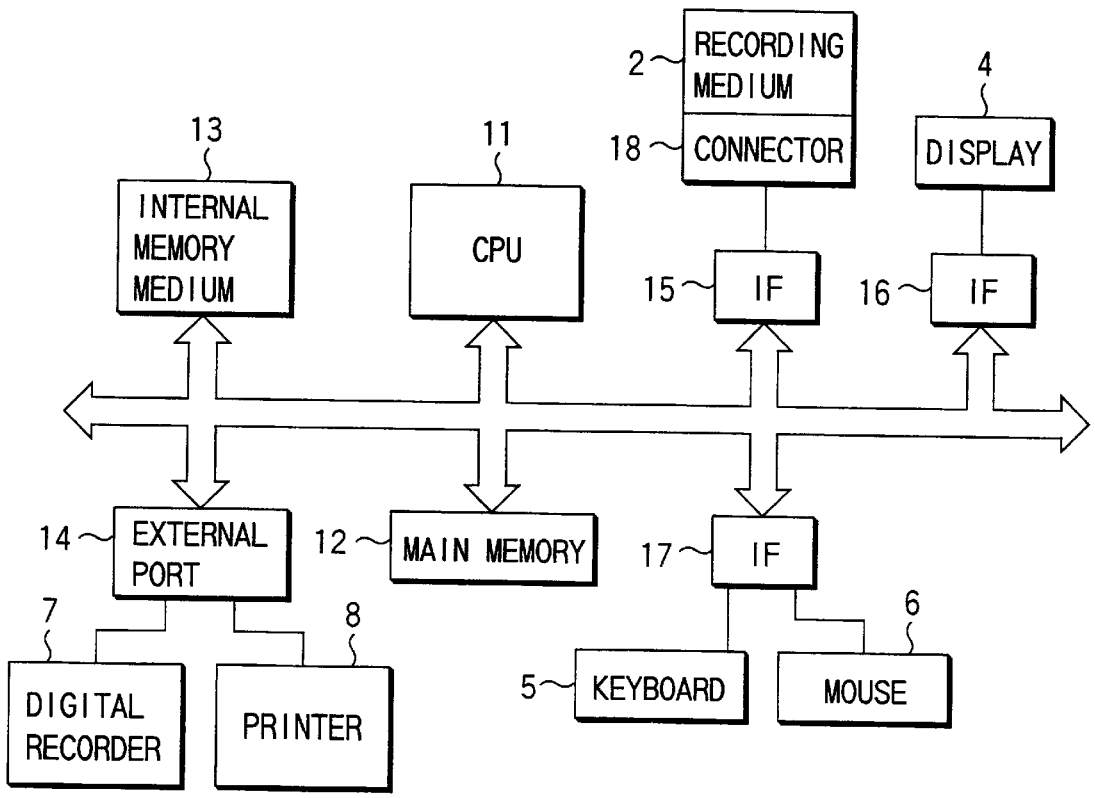
FIG. 2 is a block diagram showing an internal structure of the personal computer shown in FIG. 1.

An internal structure of the personal computer 3 will be described briefly with reference to FIG. 2.

The personal computer 3 executes a picture joining (stitching) process in accordance with a picture synthesis program, as well as the other operations and controls in accordance with various programs. The personal computer 3 comprises a CPU 11 also serving as a picture synthesizing unit, a main memory 12 which is as an operation area of the CPU 11 and into which the picture synthesis program is loaded, an internal memory medium 13, e.g., a hard disk or a floppy disk storing the picture synthesis program, an external port 14 to be connected to external devices such as the digital recorder 7 and the printer 8, an interface (abbreviated as IF) 16 connected to the display 4, an IF 17 connected to the keyboard 5 and the mouse 6, and a connector 18 and an IF 15 to which the recording medium 2 is electrically connected. The CPU 11, the main memory 12, the internal recording medium 13, the external port 14, and the IFs 15, 16 and 17 are connected to one another via a bus.

Figure 3:
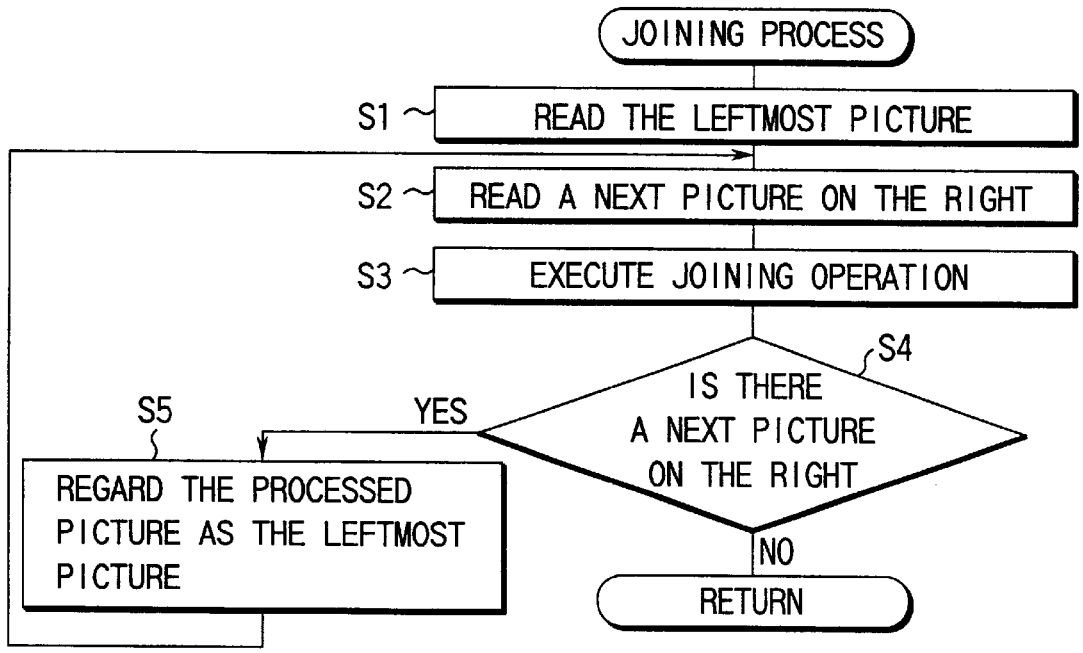
FIG. 3 is a diagram showing a basic algorithm of a picture joining process.

FIG. 3 is a diagram showing a basic algorithm of a picture joining process. The algorithm will be described with reference to FIG. 4.

Figure 4:
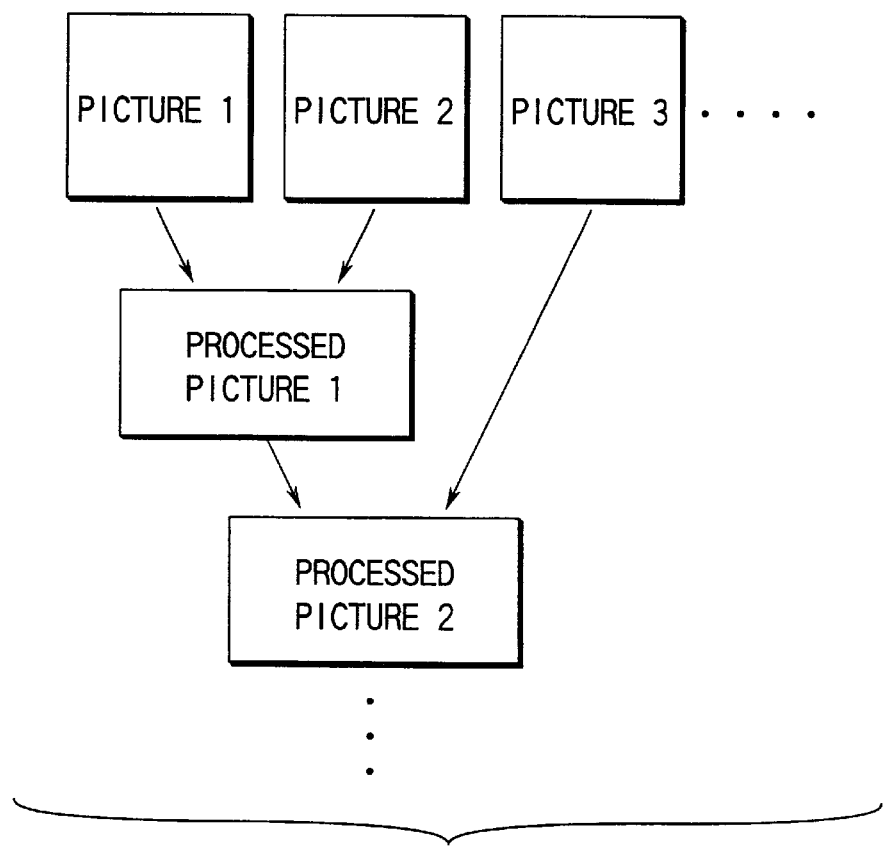
FIG. 4 is a diagram showing pictures to be joined by the algorithm shown in FIG. 3.

Prior to the joining process, a plurality of frames of picture information constituting a panorama picture are arranged as shown in the upper row of FIG. 4, in a predetermined order from the left to the right in accordance with identifying information.

When the joining process starts, first, the leftmost picture (Picture 1 in FIG. 4) is read (Step S1). Then a next picture on the right (Picture 2 in FIG. 4) is read (Step S2). The two pictures are subjected to a joining process (Step S3), thereby obtaining a processed picture. It is determined whether there is a next picture on the right (Step S4). If there is a next picture on the right, the processed picture is regarded as the leftmost picture (Step S5), and the flow returns to Step S2 in which a next picture on the right is joined to the aforementioned processed picture. In Step S4, if there is not a next picture on the right, the process is ended.

As described above, in the joining process, the first and second pictures from the left are successively joined, so that a panorama picture can be finally obtained by the automatic process.

Figure 5:
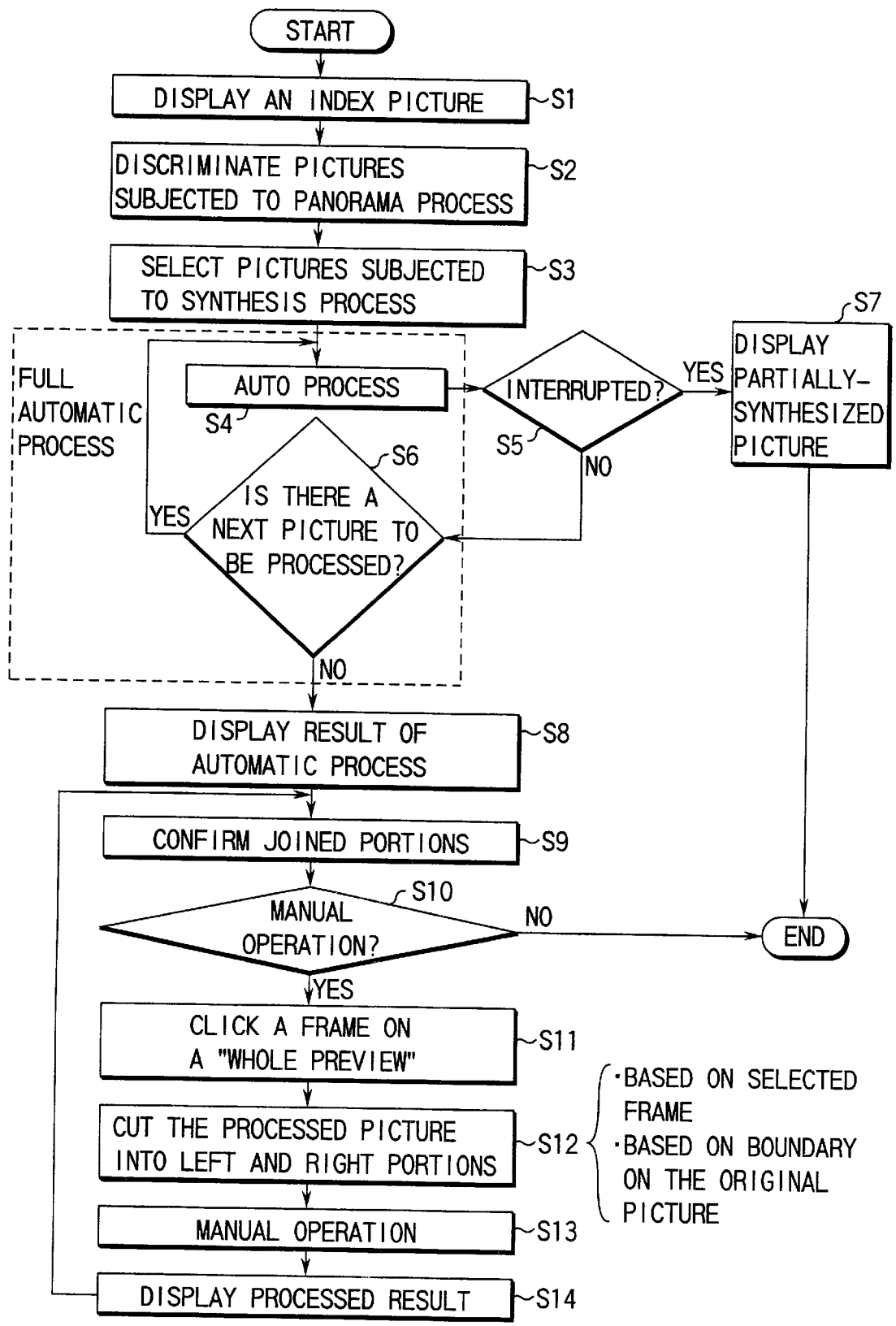
FIG. 5 is a flowchart showing operations characteristic of the present invention, i.e., a simultaneous display of a whole preview and a partial preview, and a re-synthesis process by a manual operation.

Operations characteristic of this embodiment, i.e., a simultaneous display of a whole preview and a partial preview, and a re-synthesis process by a manual operation, will now be described. FIG. 5 is a flowchart showing the operations. The flow is executed by a personal computer which reads the program stored in a recording medium, for example, a magnetic disk, and the operation of which is controlled by the program.

First, an index image (thumbnail image) is displayed (Step S1), and pictures subjected to panorama synthesis are discriminated (Step S2). To enable this discrimination, normal pictures and pictures for panorama synthesis are identified with different identifiers or the like, when pictures are captured by the digital camera. Then, pictures to be subjected to panorama synthesis are selected (Step S3).

When pictures to be subjected to panorama synthesis are selected, they are automatically joined successively from the left, for example (Steps S4 to S6). This process is basically the same as that of the algorithm shown in FIGS. 3 and 4. If the process is interrupted by clicking the "Stop" button shown in FIG. 6, a partially synthesized picture obtained before the interruption is displayed (Step S7), as will be described later.

Figure 6:
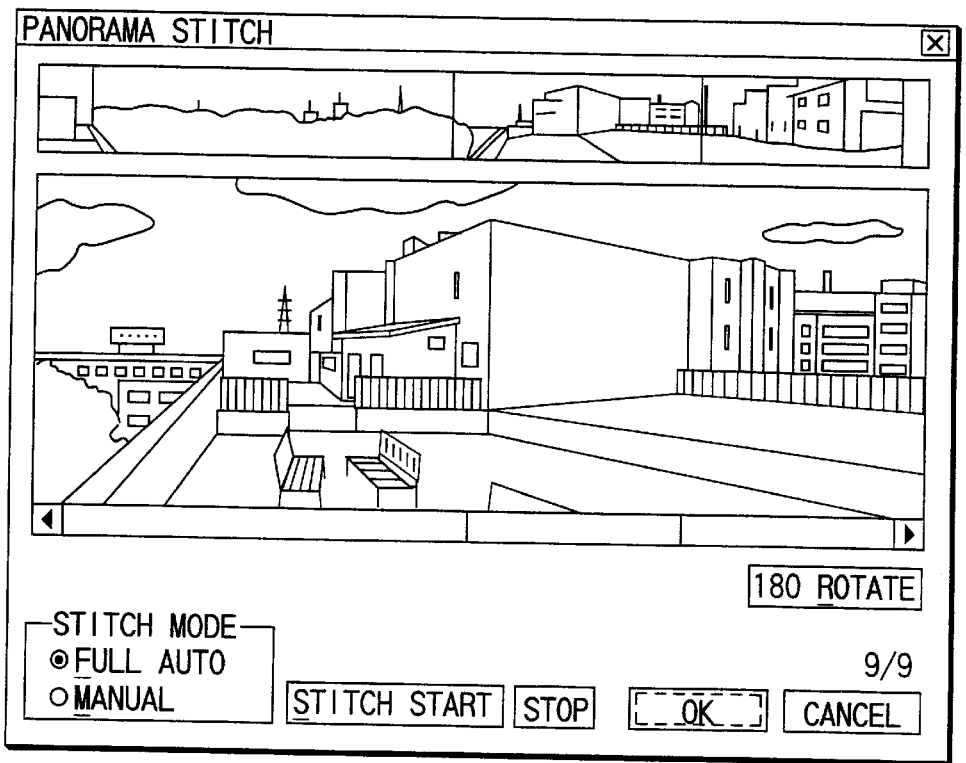
FIG. 6 is a diagram showing a state in which both a whole preview and a partial preview are displayed in the same window.

When the joining process for all the pictures is completed, the result of the automatic process is displayed as shown in FIG. 6 (Step S8). In FIG. 6, the uppermost region displays the whole picture, the middle region displays a partial picture, and the lowermost region is an operation selecting section for selecting various operations. A part of the whole picture is framed. The framed region is enlarged and displayed as a partial picture. There is a scroll bar immediately under the partial picture. The partial picture can be moved by means of the scroll bar, with the result that the frame in the whole picture can be moved accordingly. The operation selecting section includes a switching region for selecting an automatic process or a manual process, a start or stop of the synthesis process, etc.

In the initial state, the frame indicating a partial picture is located at the leftmost portion of the whole picture. Therefore, the partial picture display region displays the framed leftmost portion of the whole picture in the initial state. When a portion of the whole picture is clicked by the mouse, the whole picture is scrolled so that the partial picture including the clicked portion is located at the center of the whole picture. The frame is also moved to enclose the clicked portion of the picture. When the partial picture is moved by clicking the scroll bar thereunder, the frame in the whole picture is moved accordingly to enclose the portion displayed in the partial picture display region.

In this manner, a whole preview and a partial preview of the synthesized picture are simultaneously displayed in the same window. The whole preview shows all the synthesized result in the window, so that the whole picture of the synthesized result can be observed. The partial preview shows a part of the synthesized result in a larger size, so that the user can confirm, by scrolling, whether the joined portions are correctly synthesized. In addition, since the region corresponding to the partial preview is framed in the whole preview, the relationship between the two previews is clear.

Figure 7:
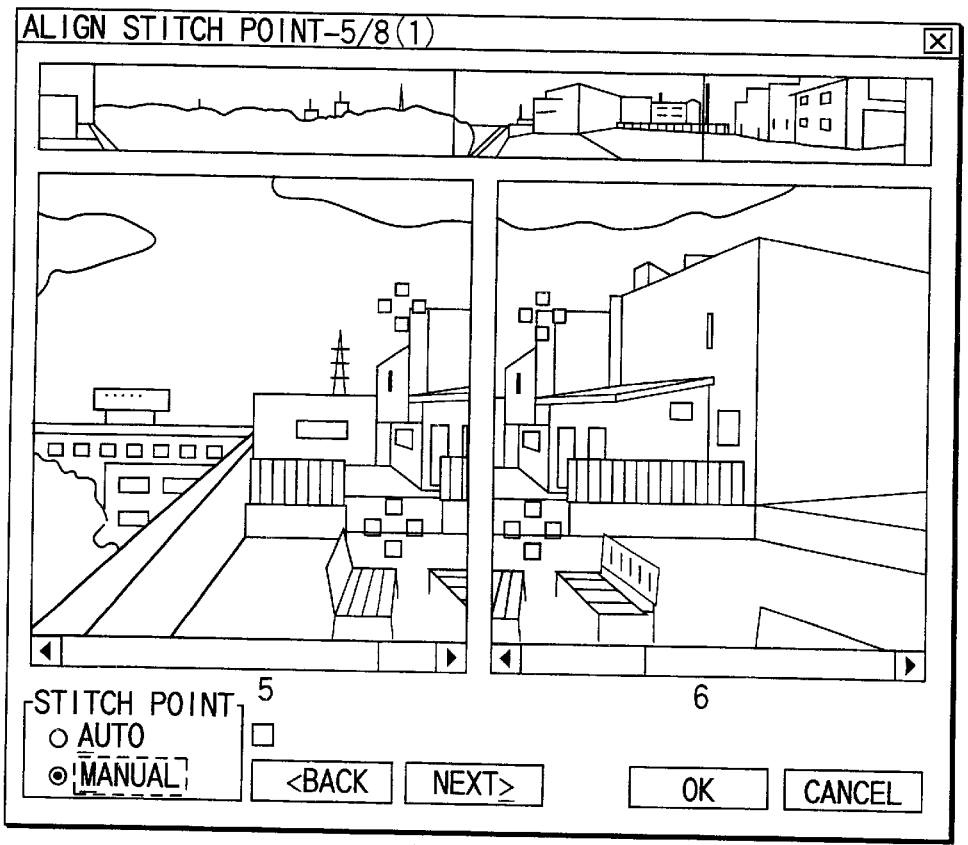
FIG. 7 is a diagram showing a state in which two partial pictures to be processed are selected.

Subsequently, it is confirmed whether the joined portions are correctly synthesized by scrolling the partial picture (Step S9), and it is determined whether a re-joining process should be executed by a manual operation (Step S10). If an incorrect portion is discovered, the "Manual" button in the "Stitch mode" section is clicked. Thereafter, two pictures to be re-processed are selected (Step S11) and the processed picture is cut into two by clicking the "Stitch Start" button shown in FIG. 6 (Step S12). The state of the screen at this time is shown in FIG. 7.

The manual operation (Step S13) is performed by selecting points to be connected from the left and right partial pictures, for example, two points from each picture. In FIG. 7, a cross mark represents a connecting point. The cross mark can be dragged to another position by the mouse. The result of the rejoining process is reflected on the whole preview and the partial preview (Step S14).

The process is returned to Step S9, in which it is confirmed again whether the joined portions are correctly synthesized by scrolling the partial picture. Then, it is determined whether a re-joining process should be executed by a manual operation. If a re-joining process is not required, the process is ended.

As described above, according to this embodiment, the whole preview corresponding to the whole picture consisting of all pictures constituting a panorama picture and the partial preview corresponding to a part of the whole picture are displayed simultaneously on the same screen. As a result, the user can easily confirm whether the joined portions are correctly synthesized, while observing the overall image of the result of synthesis. In addition, the portion displayed in the partial preview is framed in the whole preview, so that the relationship between the two previews can be clear. Further, since the result of synthesis is easily and clearly confirmed through the partial preview, only an incorrect portion can be re-synthesized by the manual operation. Therefore, the panorama picture synthesis process can be executed accurately and quickly.

Figure 8:
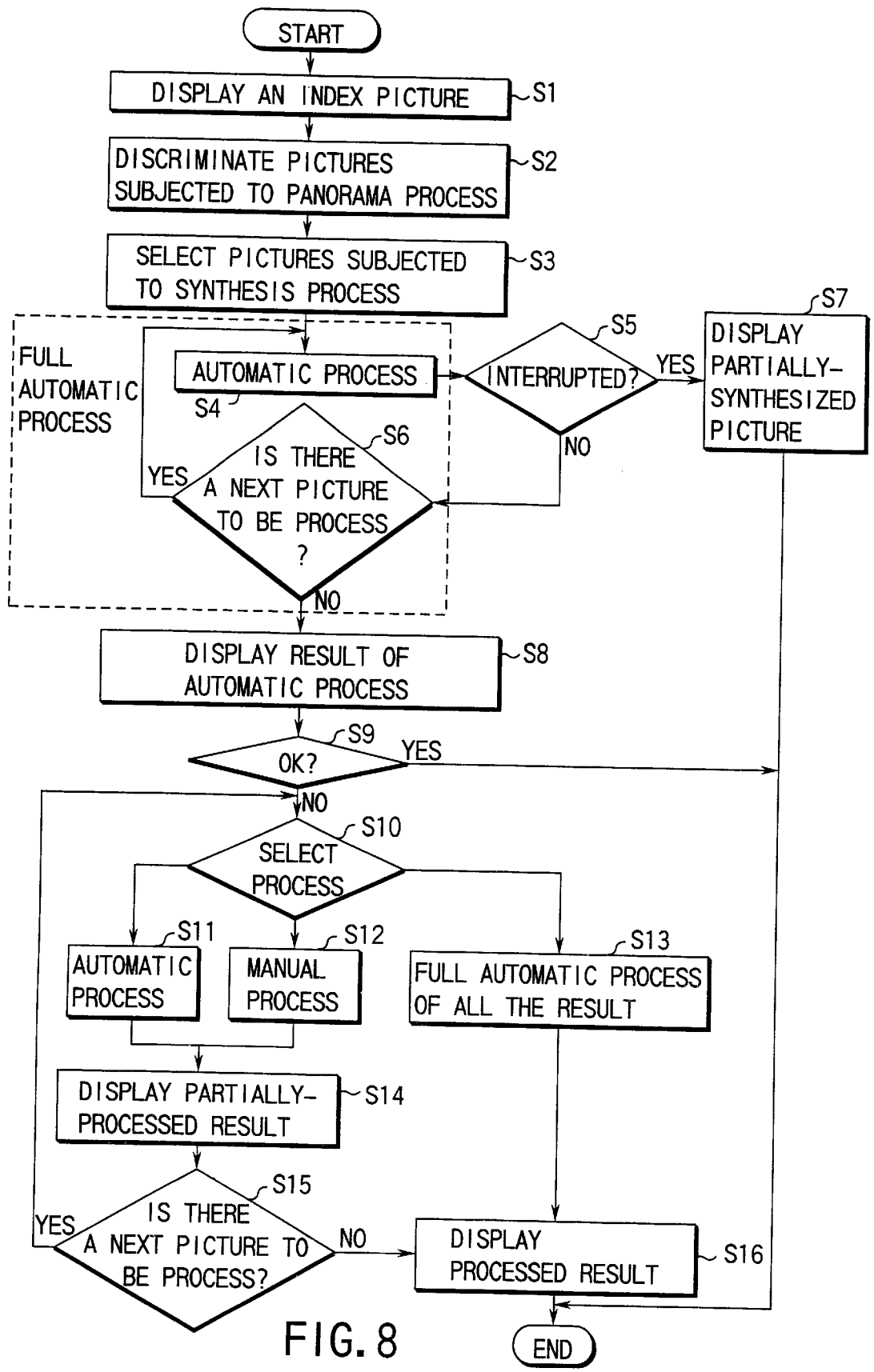
FIG. 8 is a flowchart showing a panorama picture synthesis process according to a second embodiment of the present invention.

FIG. 8 is a flowchart showing a panorama picture synthesis process according to a second embodiment of the present invention. In this embodiment, the automatic operation and the manual operation of the picture synthesis process can be switched.

In FIG. 8, Steps S1 to S8 are the same as those in the first embodiment shown in FIG. 5. Thereafter, in the second embodiment, it is determined whether the picture of the processed result is satisfactory (Step S9). If the picture is not satisfactory, the subsequent process is selected (Step S10). More specifically, an automatic process (Step S11), a manual process (Step S12) or a full automatic process of all the rest (Step S13) is selected. The automatic process and the manual process are executed in the same manner as in the first embodiment.

If the automatic process or the manual process is selected, a partially-processed result of the process is displayed (Step S14). Then, it is determined whether there is a next picture to be processed (Step S15). If there is a next picture to be processed, the flow returns to Step S10. If not, the overall processed result is displayed (Step S16) and the panorama picture synthesis process is ended.

Figure 9A:
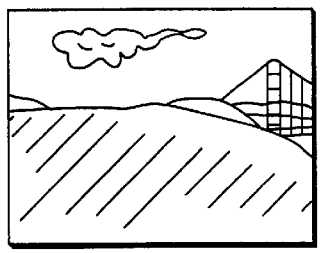
FIGS. 9A, 9B and 9C are diagrams showing three pictures to be subjected to the panorama picture synthesis process.
Figure 9B:
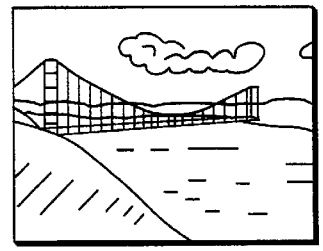
Figure 9C:
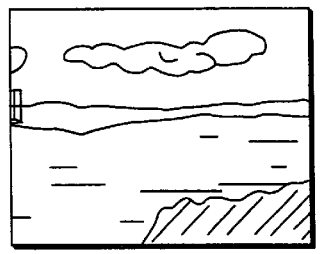
Figure 10:
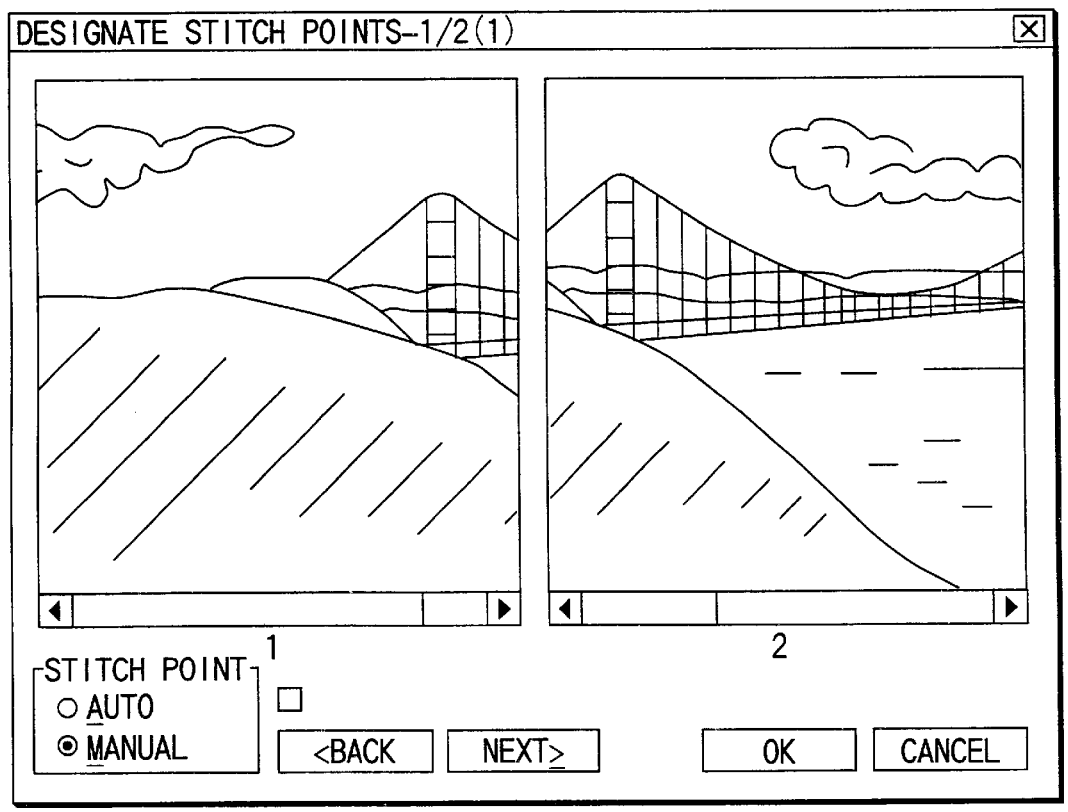
FIG. 10 is a diagram showing a state in which first and second pictures are enlarged.
Figure 11:
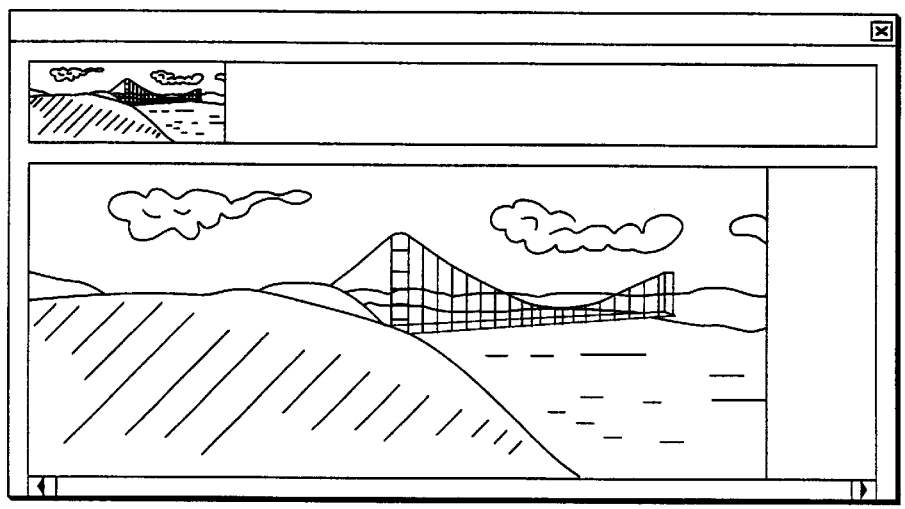
FIG. 11 is a diagram showing a result of synthesis of the first and second pictures.
Figure 12:
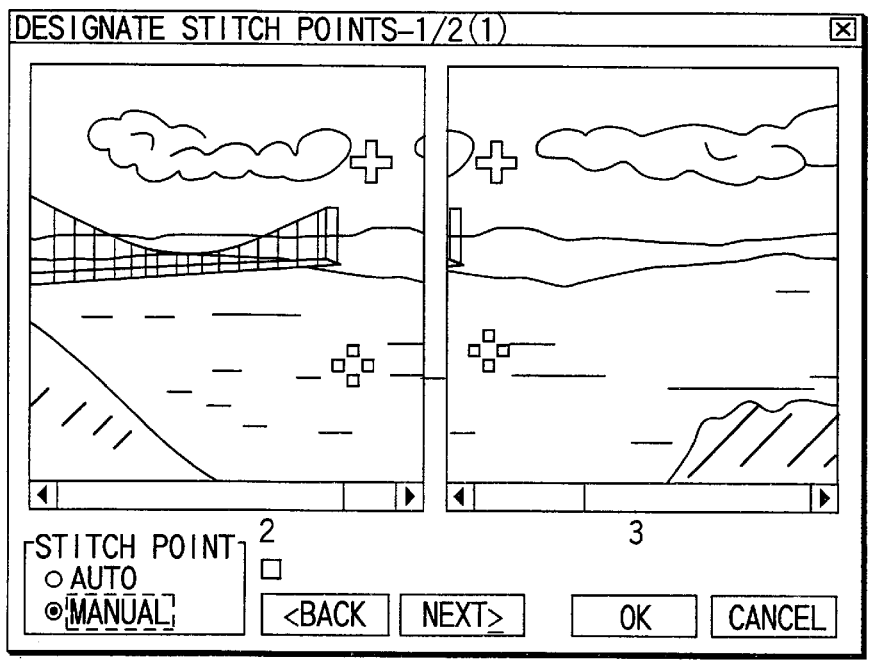
FIG. 12 is a diagram showing a state in which the second and third pictures are enlarged.
Figure 13:
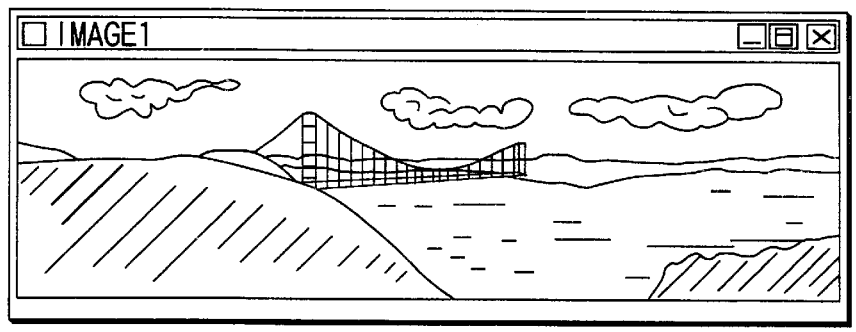
FIG. 13 is a diagram showing a result of synthesis of the first to third pictures.

For example, synthesis of three pictures as shown in FIGS. 9A, 9B and 9C will be described. In the display of the automatic process result in Step S8, a first picture (FIG. 9A) and a second picture (FIG. 9B) are displayed large, as shown in FIG. 10. At this time, the whole preview and the partial preview may be displayed simultaneously, as shown in FIG. 6. If the automatic process is selected, pictures are joined in accordance with the algorithm explained before, and the result of processing the first and second pictures is displayed, as shown in FIG. 11. At this time, the whole preview and the partial preview are displayed simultaneously on the same screen. Subsequently, as shown in FIG. 12, the manual operation is selected to synthesize the second and third pictures. As a result, a panorama picture as shown in FIG. 13 is finally produced.

As described above, according to this embodiment, pictures can be synthesized by either the manual process or the automatic process on the basis of the partial preview in which partial pictures are displayed large. For this reason, the load on the user required for the synthesis process can be reduced as compared to the case where all pictures are synthesized manually. Further, since all pictures are not synthesized automatically, but part of them can be processed manually, the synthesis process (joining process) can be performed more accurately. Moreover, special joining processes according to the user's needs can be executed, with the result that the degree of freedom of the picture synthesis process is increased.

Furthermore, when the manual synthesis or the automatic synthesis is selected, the whole preview and the partial preview are displayed simultaneously. Therefore, the user can easily confirm whether the joined portions are correctly synthesized, while observing the whole picture of the result of synthesis.

In the automatic panorama synthesis process, an intermediate result of an automatic panorama picture synthesis process can be displayed as a preview of progress. In this case, it is clear at a glance to what extent the picture synthesis has proceeded. A stop button corresponding to the operation of Step S5 in FIGS. 5 and 8 is provided on the screen, in which case the user can interrupt the process at a desired timing, while observing the progress of synthesis, and obtain the partially synthesized picture as a panorama synthesis picture.

Figure 14:
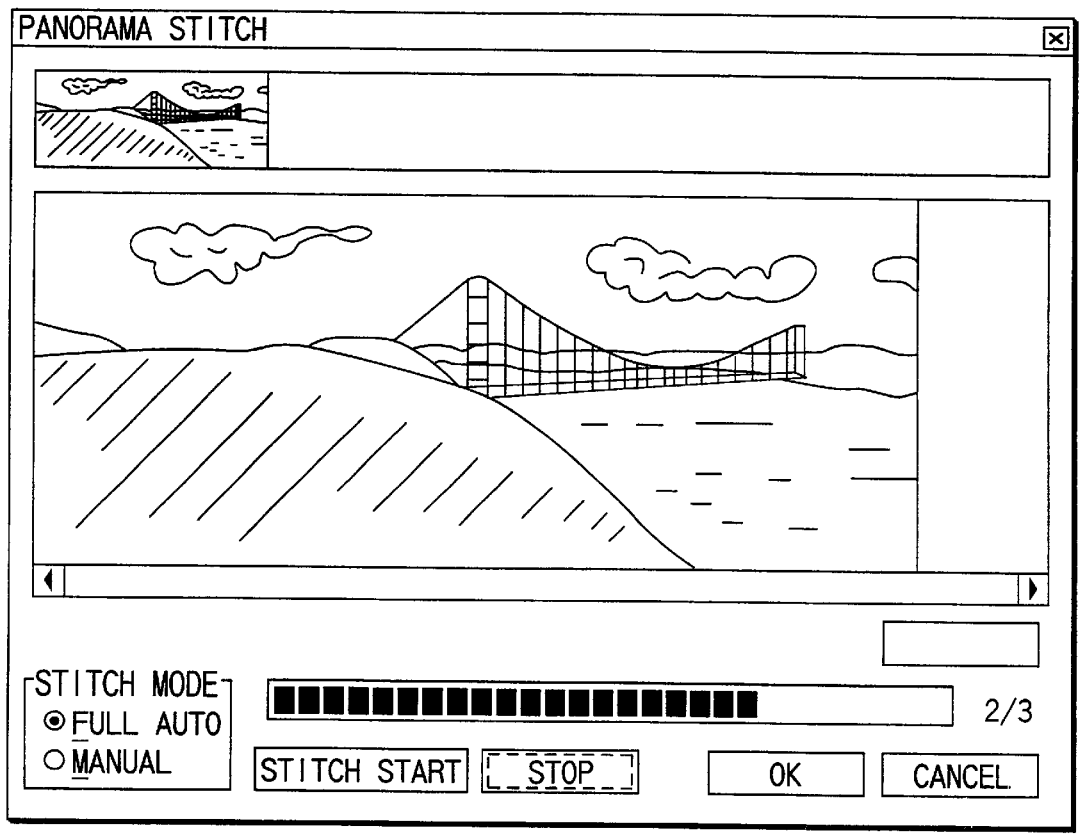
FIG. 14 is a diagram showing a state in which an intermediate result of an automatic panorama picture synthesis process is displayed as a preview of progress.
Figure 15:
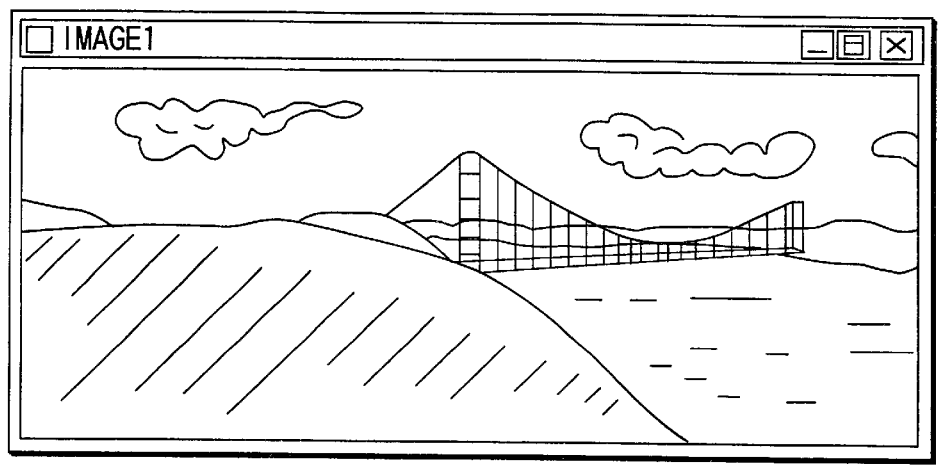
FIG. 15 is a diagram showing a resultant picture obtained when the panorama picture synthesis process is interrupted in the middle.
Figure 16:
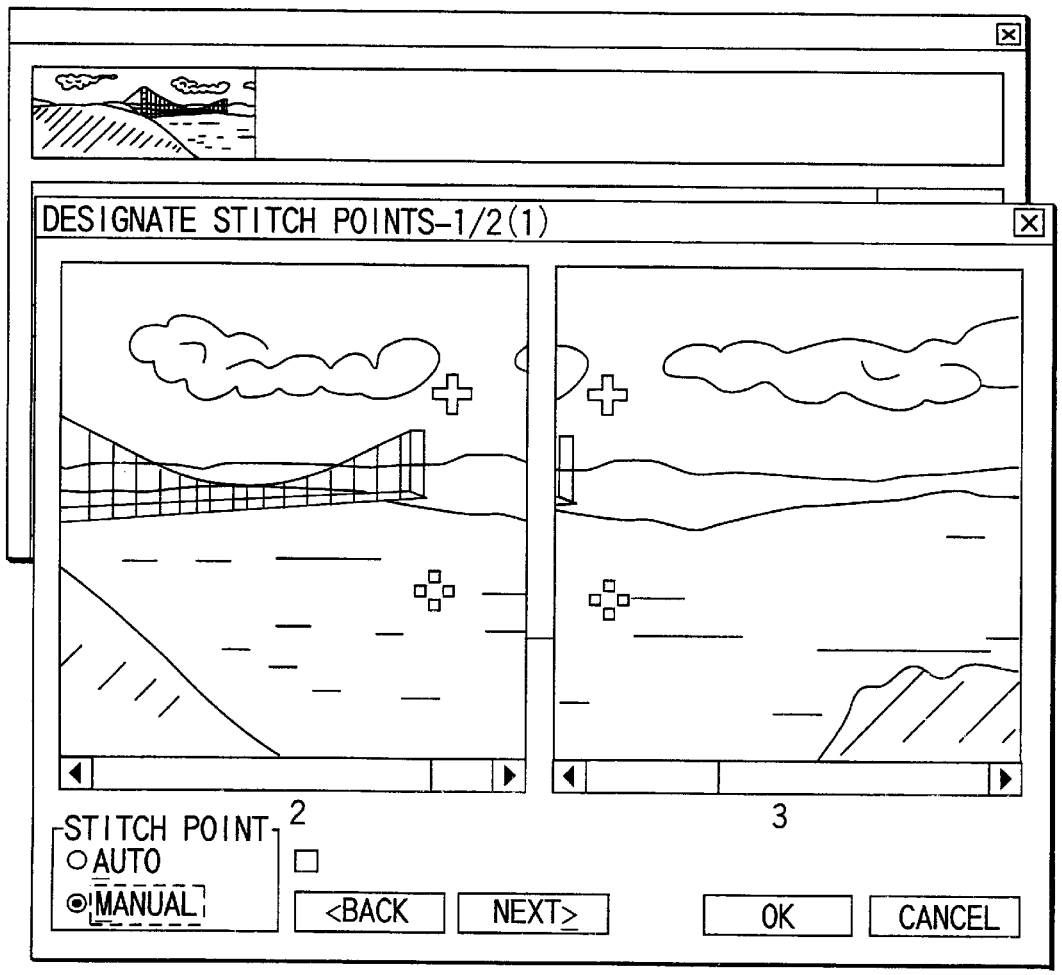
FIG. 16 is a diagram showing a state in which characteristic points and corresponding points for use in a manual process are extracted, while a partially synthesized result is displayed as a preview in another window.

FIG. 14 shows a display screen on which an automatic panorama synthesis process of three pictures is interrupted. The intermediate process result is shown in FIG. 15.

In the process of panorama-synthesizing a plurality of pictures, when characteristic points and corresponding points for use in the manual process are extracted, a partially synthesized result can be displayed as a preview in another window. As a result, the user can easily confirm the result or to what extent the process has been progressed, without scrolling the screen.

The present invention is not limited to the above embodiments. In the second embodiment, an automatic picture synthesis process is performed prior to the process selection in Step S10. However, the picture synthesis process in advance is not necessarily required. In other words, in the state shown in FIG. 10, either the automatic or manual process can be selected to execute the synthesis process, while the user is observing two partial pictures. Further, the process of joining pictures in the automatic synthesis is not necessarily limited to the algorithm shown in FIGS. 3 and 4, but can be suitably modified according to the specification. Similarly, the process of joining pictures in the manual synthesis can be suitably modified according to the specification.

The method of the aforementioned embodiments can be written as a program executable by a computer into a recording medium, such as a magnetic disk (a floppy disk, a hard disk, etc.), an optical disk (a CD-ROM, a DVD, etc.), and a semiconductor memory, so that it can be applied to various apparatuses. Alternatively, the program can be transmitted to various apparatuses through a communication medium. The computer for realizing the apparatus of the present invention reads the program stored in the recording medium, and controlled by the program, so that the aforementioned process can be executed.

As has been described above in detail, according to the present invention, the whole preview and the partial preview of the panorama picture are displayed on the same screen. As a result, the user can join adjacent pictures together, while observing the overall synthesis result. Therefore, a number of pictures can be joined accurately, while the user is observing the overall synthesis result during the synthesis process.

Further, pictures can be synthesized by switching between the manual process and the automatic process based on the partial preview. Therefore, even if the number of pictures is increased, the load on the user required for joining pictures can be light and the degree of freedom in joining the pictures can be maintained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A panorama picture synthesis apparatus for synthesizing a panorama picture from a plurality of picture data obtained by capturing a plurality of parts of an object such that they overlap one another, said panorama picture synthesis apparatus comprising:
   a whole picture display section configured to display a whole picture including all pictures constituting the panorama picture;
   a partial picture designating section configured to designate a plurality of partial pictures within a predetermined range of the whole picture;
   an automatic synthesizing section configured to synthesize the partial pictures designated by the partial picture designating section by automatically joining them to construct an automatically synthesized picture;
   a manual synthesizing section configured to divide the automatically synthesized picture into divided pictures in accordance with a predetermined operation, and synthesize the divided pictures by manually joining them to construct a manually synthesized picture; and
   a partial picture display section configured to display the pictures synthesized by the automatic synthesizing section or the manual synthesizing section in an enlarged size on a screen simultaneously with the whole picture.

2. A panorama picture synthesis apparatus according to claim 1, wherein the partial picture designating section includes an identifying section configured to automatically identify a panorama picture from the whole picture.

3. A panorama picture synthesis apparatus according to claim 1, wherein the whole picture display section includes a frame display section configured to display a frame around the partial pictures designated by the partial picture designating section.

4. A panorama picture synthesis apparatus according to claim 1, further comprising a display section configured to display a region among the whole picture which corresponds to the synthesis picture synthesized by the automatic synthesizing section or the manual synthesizing section in place of a synthesis picture synthesized by the automatic synthesizing section or the manual synthesizing section.

5. A panorama picture synthesis apparatus according to claim 1, further comprising a scroll section configured to scroll a frame displayed around the designated partial pictures.

6. A panorama picture synthesis apparatus according to claim 1, wherein-the automatic synthesizing section includes a processing section configured to rearrange the plurality of picture data in a predetermined order based on identification information of the picture data and to output rearranged picture data, and perform an operation of successively joining the rearranged picture data, thereby producing a panorama picture.

7. A panorama picture synthesis apparatus according to claim 1, wherein the automatic synthesizing section discriminates pictures intended for panorama synthesis based on identification names appended to normal pictures and the pictures intended for panorama synthesis, and automatically joins the pictures intended for panorama synthesis successively.

8. A panorama picture synthesis apparatus according to claim 7, wherein, when a joining process by the automatic synthesizing section is interrupted, the whole picture display section displays a partially processed picture obtained before interruption.

9. A panorama picture synthesis apparatus according to claim 1, wherein the whole picture display section displays a frame enclosing a region of the whole picture, and displays in an enlarged size the region of the whole picture which is enclosed by the frame as a partial picture.

10. A panorama picture synthesis apparatus according to claim 1, wherein the whole picture display section and the partial picture display section display a whole preview and a partial preview of a synthesized result simultaneously in a same window.

11. A panorama picture synthesis apparatus according to claim 1, wherein the whole picture display section and the partial picture display section display part of a synthesized result in an enlarged size to confirm whether a joined portion is correctly synthesized, and display a frame indicating a partial preview in a whole preview.

12. A panorama picture synthesis apparatus according to claim 1, wherein the manual synthesizing section confirms whether the partial pictures joined by the automatic synthesizing section are correctly synthesized, and selectively rejoins the partial pictures joined by the automatic synthesizing section.

13. A panorama picture synthesis apparatus according to claim 12, wherein the manual synthesizing section selects two pictures to be rejoined, separates the two pictures to generate separated pictures, selects two connecting points of the separated pictures, and drags the two connecting points to other positions, to rejoin to two pictures.

14. A panorama picture synthesis method comprising the steps of:

displaying a whole picture including all pictures constructing a panorama picture from a plurality of picture data obtained by capturing a plurality of parts of an object such that they overlap one another;

designating a plurality of partial pictures within a predetermined range of the whole picture;

synthesizing the partial pictures designated by the partial picture designating step by automatically joining them to construct an automatically synthesized picture;

dividing the synthesized picture into divided pictures in accordance with a predetermined operation, and synthesizing the divided pictures by manually joining them to construct a manually synthesized picture; and enlarging the pictures synthesized by the automatic synthesizing step or the manual synthesizing step and displaying the enlarged pictures on a screen simultaneously with the whole picture.

15. A panorama picture synthesis method according to claim 14, wherein the partial picture designating step includes a step of automatically identifying a panorama picture from the whole picture.

16. A panorama picture synthesis method according to claim 14, wherein the partial picture designating step includes a step of displaying a frame around the partial pictures designated by the partial picture designating section.

17. A panorama picture synthesis method according to claim 14, further comprising a step of displaying a region among the whole picture which corresponds to the synthesized picture synthesized by the automatically synthesizing step or the manually synthesizing step in place of a partial picture synthesized by the automatically synthesizing step or the manually synthesizing step.

18. A panorama picture synthesis method according to claim 14, further comprising a scrolling step of scrolling a frame displayed around the designated partial pictures.

19. A panorama picture synthesis method according to claim 14, wherein the automatic synthesizing step includes a step of rearranging the plurality of picture data in a predetermined order based on identification information of the picture data to generate rearranged picture data, and successively joining the rearranged picture data, thereby producing a panorama picture.

20. A panorama picture synthesis method according to claim 14, wherein the automatically synthesizing step includes a step of discriminating pictures intended for panorama synthesis based on identification names appended to normal pictures and the pictures intended for panorama synthesis, and automatically rejoining the pictures intended for panorama synthesis successively.

21. A panorama picture synthesis method according to claim 20, further comprising a step of, when a rejoining process of the automatic synthesizing step is interrupted, displaying a partially processed picture obtained before interruption.

22. A panorama picture synthesis method according to claim 14, further comprising a step of displaying a frame enclosing a region of the whole picture, and displaying in an enlarged size the region enclosed by the frame as a partial picture.

23. A panorama picture synthesis method according to claim 14, further comprising a step of displaying a whole preview and a partial preview of a synthesized result simultaneously in a same window.

24. A panorama picture synthesis method according to claim 14, further comprising a step of displaying part of a synthesized result in an enlarged size to confirm whether a joined portion is correctly synthesized, and displaying a frame indicating a partial preview in a whole preview.

25. A panorama picture synthesis method according to claim 14, further comprising a step of confirming whether the partial pictures joined by the automatically synthesizing step are correctly synthesized, and selectively rejoining the partial pictures joined by the automatically synthesizing step.

26. A panorama picture synthesis method according to claim 25, further comprising a step of selecting two pictures to be rejoined, separating the two pictures to generate separated pictures, selecting two connecting points of the separated pictures, and dragging the two connecting points to other positions, to rejoin the two pictures.

27. A recording medium storing a panorama picture synthesis program, readable by a computer and used for controlling the computer to synthesize a panorama picture from a plurality of picture data obtained by capturing a plurality of parts of an object such that they overlap one another, said program comprising:

instruction means for instructing the computer to display a whole picture including all pictures constituting the panorama picture;

instruction means for instructing the computer to designate a plurality of partial pictures within a predetermined range of the whole picture;

instruction means for instructing the computer to synthesize the designated partial pictures by automatically joining them to construct an automatically synthesized picture;

instruction means for instructing the computer to divide the automatically synthesized picture into divided pictures in accordance with a predetermined operation, and synthesize the divided pictures by manually joining them to construct a manually synthesized picture; and instruction means for instructing the computer to display the pictures synthesized by the automatically synthesizing or the manually synthesizing in an enlarged size on a screen simultaneously with the whole picture.

* * * * *